March 21, 1967  R. G. ZELLER  3,310,642
TAIL GATE ELECTRIC WINDOW AND GATE SWITCH
Filed April 30, 1964  3 Sheets-Sheet 1

INVENTOR.
ROBERT G. ZELLER
BY C. R. Meland
HIS ATTORNEY

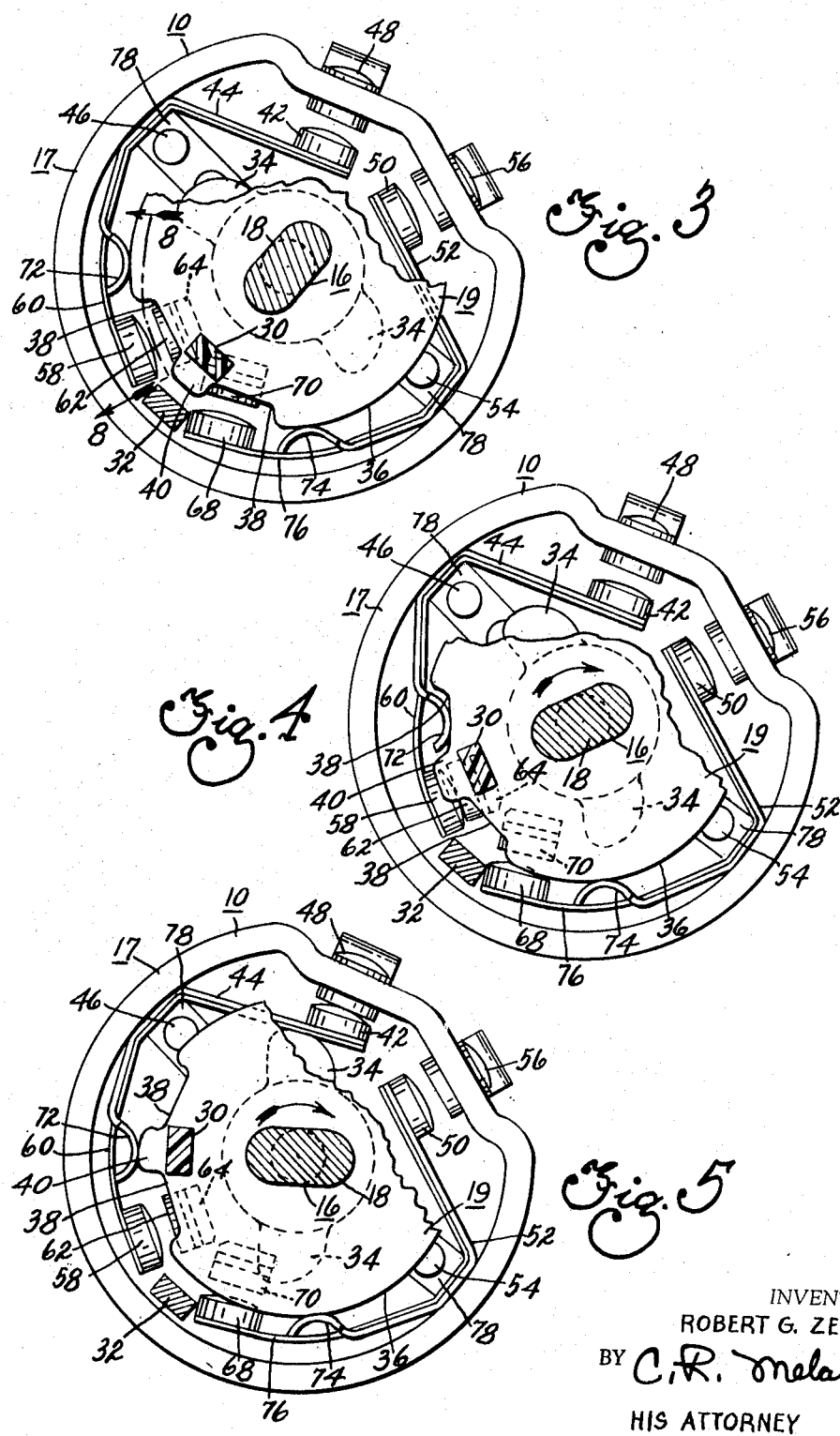

INVENTOR.
ROBERT G. ZELLER
BY *C. R. Meland*
HIS ATTORNEY

United States Patent Office 3,310,642
Patented Mar. 21, 1967

3,310,642
TAIL GATE ELECTRIC WINDOW AND
GATE SWITCH
Robert G. Zeller, Warren, Mich., assignor to General
Motors Corporation, Detroit, Mich., a corporation of
Delaware
Filed Apr. 30, 1964, Ser. No. 363,853
4 Claims. (Cl. 200—44)

This invention relates to electric switches and more particularly to a type of switch that is used for sequentially operating the tail gate and electric window for an automobile station wagon.

It is desirable in the design of certain automobiles and similar vehicles to have an electrically operated tail gate and window. In a station wagon, for example, it is common to have the rear portion of the vehicle enclosed by a window and a tail gate. The window occupies the top half of the rear wall portion and normally retracts into the tail gate. Because of the sealing arrangements between the window and the main station wagon body, the window normally slides in channels on the periphery of the rear wall opening or against seals provided on the periphery of the rear wall opening. For this reason and for the reason of the danger of window breakage, it is desirable to have the window retract into the lower portion of the rear wall, namely, the tail gate, before the tail gate is dropped to provide access to the rear of the vehicle. This brings about a need for a sequential operation of the window and the tail gate, both when the tail gate is being lowered and when it is being raised.

It is also common in the design of station wagons to provide a lock to prevent unauthorized entry into the main portion of the vehicle. In the interest of unification of controls, it would further become desirable to combine the operation of the tail gate lock and the electrically operated window and tail gate.

It is an object of the present invention to combine into one control the lock and the electrical switch for the operation of a powered tail gate and window assembly.

It is another object of the present invention to provide an improved electrical switch that is operable by turning the key in a lock cylinder.

It is still another object of the present invention to provide an improved electrical switch which is capable of sequential operation of electrical circuits.

It is a further object of the present invention to provide an improved key operated electrical switch for an automobile station wagon that is simple and economical to manufacture.

It is still a further object of the present invention to provide an improved electrical switch that can be actuated by use of a lock cylinder of common design.

Further objects and advantages of the present invention will be apparent from the following description, reference being had to the accompanying drawings wherein a preferred embodiment of the present invention is clearly shown.

In the drawings:

FIGURE 3 is a sectional view taken along line 3—3 of FIGURE 2 illustrating the switch in a neutral position;

FIGURE 4 is a sectional view taken along line 3—3 of FIGURE 2 illustrating the subject switch in one condition of sequential operation;

FIGURE 5 is a sectional view taken along line 3—3 of FIGURE 2 showing the subject switch in another condition of sequential operation;

Figure 1:
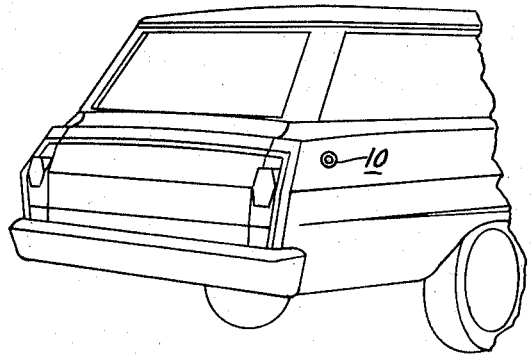
FIGURE 1 illustrates the subject invention in an operative location on a station wagon body.

Referring now to FIGURE 1, the subject switch, generally designated by the numeral 10, is shown in its operative location near the rear portion of a station wagon.

Figure 2:
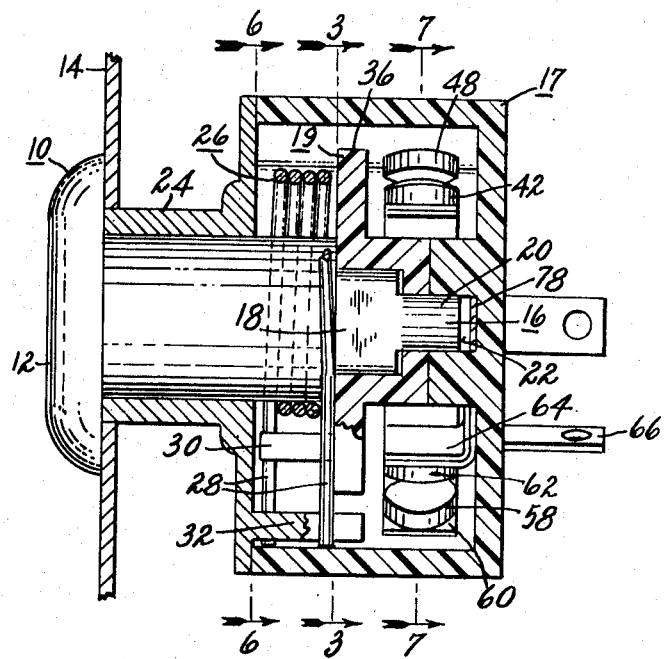
FIGURE 2 is a sectional view of the subject invention.
Figure 6:
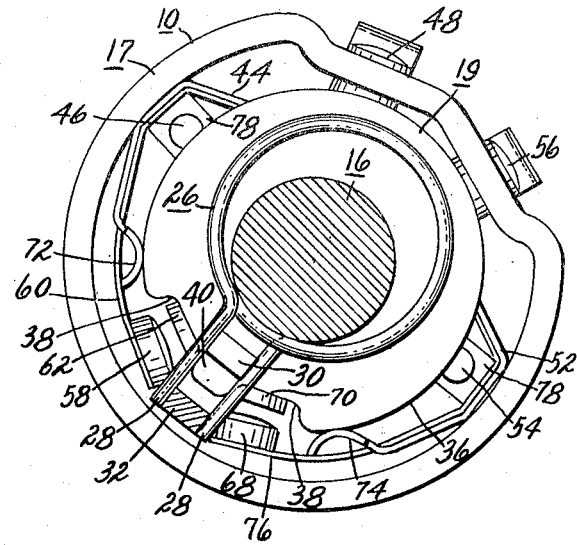
FIGURE 6 is a sectional view taken along line 6—6 of FIGURE 2.

Referring now to FIGURE 2, a lock cylinder 12 is carried in a wall 14 of the station wagon. The lock cylinder 12 has a key operated rotatable extension 16 disposed within a switch body 17. The extension 16 has an oval portion 18 arranged to cooperate with a rotatable member 19 to form a driving engagement therewith. A cylindrical end 20 of the extension 16 cooperates with a pocket 22 in the switch body 17 in order to form a bearing arrangement for support of the lock cylinder in its mounted position. A portion 24 of the switch body 17 carries the lock cylinder 12 in its operative mounting. A coil spring 26 is circumferentially disposed about the lock cylinder 12 and has downwardly extending lugs 28 disposed in spaced relationship to each other. A flange 30 extending from one portion of the rotatable member 19 and a flange 32 extending from the portion 24 of the switch body 17 pass between the downwardly extending lugs 28. The portion 24 of the switch body 17 being a non-rotatable member maintains the spring 26 in fixed relationship thereto, but the flange 30 being a part of the rotatable member 19 is adapted for rotation therewith and, during rotation of the rotatable member 19, the flange 30 will engage either of the lugs 28 of the spring 26 depending on the direction of rotation. Therefore, any rotation of the rotatable member 19 is against the bias of the spring 26. This relationship of the flanges 30 and 32 with the lugs 28 is herein referred to as the centering means and is more clearly illustrated in FIGURE 6.

Referring now to FIGURE 3, the rotatable member 19 is illustrated as having a pair of outwardly projecting cams or lobes 34. An outer periphery of the rotatable member 19, designated by the numeral 36, has a series of cam portions 38 and a cam portion 40. The periphery 36 of the rotatable member 19 is at a different level than the cam lobes 34 and cooperates with contacts to be hereinafter described that are likewise located at the different levels.

Figure 7:
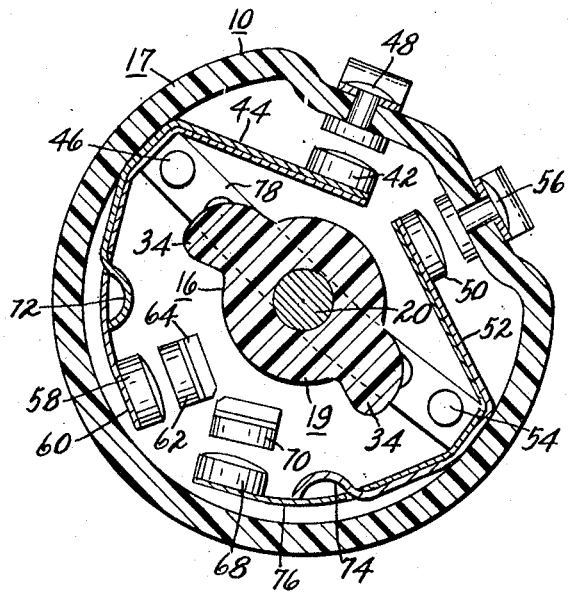
FIGURE 7 is a sectional view of the subject device taken along line 7—7 of FIGURE 2.
Figure 8:
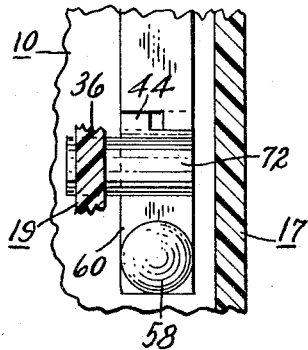
FIGURE 8 is a partial sectional view of the subject invention taken along line 8—8 of FIGURE 3.

A contact 42 carried by an arm 44 firmly attached to the switch body 17 at point 46 is positioned in opposition to a fixed contact 48 mounted through one wall of the switch body 17. In the preferred embodiment, the arm 44 serves to bias the contact 42 away from the contact 48. On the opposite side of the switch body 17, a contact 50 is carried by an arm 52 which is firmly mounted to the switch body 17 at point 54. The arm 52 serves to bias the contact 50 away from a fixed contact 56 mounted through a wall of the switch body 17 in much the same manner as contact 42 is biased away from the fixed contact 48. This relationship of contacts is more clearly seen in FIGURE 7. In the preferred embodiment, the fixed contact 48 could be in electrical relationship with a motor which drives the tail gate of the station wagon to a lowered position and the contact 56 could be in electrical relationship to a motor which drives the tail gate window to a raised position. It is understood that the description of the electrical relationship to other electrical equipment is illustrative only and is not deemed to be any portion of the present invention.

Referring now to FIGURE 3, a movable contact 58 is carried by a conductive member 60 which is firmly attached to the switch body at point 46. It is seen in FIGURE 3 that the conductive member or arm 60 is a conductive member extending into conductive relationship with the movable contact 42 previously described. The resilient arm 44 previously described extends in substantially parallel relationship to the conductive member 60 toward the movable contact 58 and serves to bias the conductive member 60 toward a fixed contact 62. The fixed contact 62 is attached to a conductive member 64 which, in turn, electrically engages a terminal 66 in any well-known manner. The mounting of a movable contact 68 is mounted in opposition to a fixed contact 70 in the same manner in which the contact 62 is mounted in opposition to the movable contact 58.

It should be understood, in order to fully understand the operation of this switch, that the movable contacts 42 and 50 are maintained out of engagement with the fixed contacts 48 and 56, respectively, by the biasing arms 44 and 52. On the other hand, the movable contacts 58 and 68 are maintained away from the fixed contacts 62 and 70 by the cam follower portions 72 and 74, respectively, held against a normal bias by the outer periphery 36 of the rotatable member 19. It is seen in FIGURE 3 that the cam follower portions 72 and 74 are actually extensions of the biasing arms 44 and 52. The conductive member 60 and a conductive member 76 are parallelly carried by the arms 44 and 52 and serve as a conductive path between the movable contacts to which they are conductively engaged. A conductive strip 78 connects the points 46 and 54 and conductively engages a terminal to a hot lead, not shown, in any well-known manner.

In operation, the disposition of the cams 34 and the cam portion 38 relative to the movable and fixed contacts are essentially as seen in FIGURE 3 when the switch is in the neutral position. In order to initiate a cycle of operation, it must be understood that a key, not shown, is inserted into the lock cylinder 12 and is rotated. As previously stated, the extension 16 of the lock cylinder 12 is responsive to key movement and, due to the engagement of the oval portion 18 with a cooperating aperture in the rotatable member 19, the rotatable member will follow the key movement.

Referring now to FIGURE 4, the arrow shown therein will indicate the direction of the proposed movement of the key with the rotatable member. It is seen that, with the initial amount of rotation of the rotatable member 19, the cam follower portion 72 of the arm 44, being biased toward the rotatable member 19, drops into one of the cam portions 38. This portion of the arm 44 is biased in the direction of the cam follower and, therefore, the conductive member 60 and the attached contact 58 are carried into conductive engagement with the fixed contact 62. In the operative environment of the rear window and tail gate arrangement for a station wagon, the contact 62 would be electrically connected to a motor which drives the window downwardly. As previously indicated, this downward movement of the window is necessary in order to have the window clear the sealing members of the outer periphery of the rear end of a station wagon before the tail gate moves away from the body of the wagon.

Referring now to FIGURE 5, the cycle of operation has progressed to the point where the rotatable member 19 is further rotated by means of the key in the lock cylinder after the window has been lowered completely. In FIGURE 5, it is seen that the cam portion 40 of the outer periphery 36 has reengaged the cam follower 72 and driven the movable contact 58 out of engagement with the fixed contact 62. At the same time, one of the lobes 34 has engaged the conductive member 60 at a point near the movable contact 42. As stated previously, the movable contact 42 is biased away from the fixed contact 48 and the engagement of the cam 34 is required to drive it into engagement therewith. This engagement is accomplished in the view illustrated in FIGURE 5 and the contact 48 would be electrically connected, as previously recited, in the preferred embodiment to a tail gate "down" motor. When the cycle has been completed and the tail gate is completely down, pressure is released from the key and the biasing force of the lugs 28 of the spring 26 bearing against the flanges 30 and 32 causes the rotatable member to be returned to a neutral or centered position automatically. In this manner, the contacts are disengaged from any electrical connections and the electric switch described herein is again in the neutral position illustrated in FIGURE 3.

When the cycle of operation is to be reversed, the key is merely rotated in the opposite direction and the same sequence of events will take place, namely, the tail gate will be drawn into a closed position and further movement of the rotatable member into a contacting position with the conductive member 64 will cause the window to be raised to its high position. It is obvious from the description and drawings that the switch can be used to merely raise and lower the window without further positioning the rotatable member to raise or lower the tail gate.

The utility of the present invention is very clear in an application where there is a sequencing of electrical operations, for instance, in the operation of a window and tail gate arrangement of the station wagon. However, it is equally obvious that, whenever electrical equipment must be sequenced in its operation, this switch would find utility. Also, it is noteworthy that the sequenced operation of the switch can be by-passed and the switch turned very quickly into the extreme position to carry on that function when it is desired in the operation of a device.

The ability of the subject electrical switch to be combined with an automotive lock merely increases its utility but is not intended to limit the use of the switch. It is clear that the switch could be operated with any type of an actuator that engaged the rotatable member in the manner described to bring about the desired rotation. It is likewise clear that accidental operation of the switch, when used in conjunction with a lock cylinder, is practically impossible because the operating portions of the switch are inaccessible without the key used to rotate the lock cylinder.

While the embodiment of the present invention, as herein disclosed, constitutes a preferred form, it is to be understood that other forms might be adopted.

What is claimed is as follows:

1. An electrical switch comprising: a switch body; actuator means extending through a wall of said switch body and adapted for rotation therein; cam means having at least two operative levels carried by said actuator means; fixed contact means carried by said switch body in a fixed relationship with respect to said cam means; and movable contact means carried by said switch body and each including a plurality of resilient extensions and contacts carried thereby disposed in opposition to each of said fixed contact means, several of said movable contact means including resilient extending members engaging one of said cam levels and several other movable contact means to move said several other contact means out of engagement with several of said opposed fixed contact means while said actuator means is in a selected condition of operation.

2. An electrical switch according to claim 1 wherein said actuator means includes a key operated lock cylinder.

3. An electrical switch according to claim 1 wherein said cam means has operative portions engaging said movable contact means in a sequential manner arranged to operate in proper sequence the tail gate and window disposed therein for an automobile station wagon.

4. In combination, a lock and electrical switch for the sequential operation of a tail gate and window therefor in an automobile station wagon, said electric switch comprising: a switch body; a key operated lock cylinder having portions extending through a wall of said switch body and adapted for rotation therein, said key operated lock cylinder including torsion means for centering said lock cylinder after rotation in either direction from a poised position; cam means having at least two operative levels carried by said actuator means; fixed contact means carried by said switch body in a fixed relationship with respect to said cam means; and movable contact means carried by said switch body and each including a plurality of resilient extensions and contacts carried thereby disposed in opposition to each of said fixed contact means, several of said movable contact means including resilient extending members engaging one of said cam levels and several other movable contact means to move said several other contact means out of engagement with several of said opposed fixed contact means while said actuator means is in a selected condition of operation.

References Cited by the Examiner
UNITED STATES PATENTS

| | | | |
|---|---|---|---|
| 2,605,367 | 1/1952 | Cochran | 200—153 |
| 2,654,005 | 9/1953 | Weber | 200—44 |
| 2,832,851 | 4/1958 | Jones | 200—6 |
| 3,172,968 | 3/1965 | Arendt | 200—44 |

ROBERT K. SCHAEFER, *Primary Examiner.*

H. HOHAUSER, *Assistant Examiner.*